BISTABLE MAGNETIC DEVICE

Filed July 31, 1963 Sheet 1 of 2

INVENTORS.
WILMER C. ANDERSON
FRANK P. RENNIE
BY [signature]
ATTORNEY.

INVENTORS
WILMER C. ANDERSON
FRANK P. RENNIE
BY
ATTORNEY.

United States Patent Office 3,421,024

Patented Jan. 7, 1969

3,421,024

BISTABLE MAGNETIC DEVICE

Wilmer C. Anderson, Greenwich, and Frank P. Rennie, Stamford, Conn., assignors to General Time Corporation, New York, N.Y., a corporation of Delaware Filed July 31, 1963, Ser. No. 299,010

U.S. Cl. 307—282 11 Claims

Int. Cl. H03k 3/26

ABSTRACT OF THE DISCLOSURE

A bistable multivibrator formed of two transistor switches controlling current flow through a pair of saturating windings on a common core having two saturation states. A pair of feedback windings are individually connected across the inputs of the switches so that once the core begins to switch toward a given saturation state, a voltage is induced in one of the feedback windings, closing its associated switch, until the core has reached that state. Successive input pulses, either of the same or of alternating polarity, alternately induce a triggering voltage in a respective one of the feedback windings so that every input pulse reverses the saturation state of the core and produces a signal of constant volt-second content available at the output circuits of the transistor switches or at an output winding on the core.

The present invention relates to bistable devices and more specifically to a magnetic bistable device, such as a multivibrator or flip-flop, having low power drain characteristics.

An object of the present invention is to provide a bistable device, such as a multivibrator or flip-flop, which is highly efficient, which minimizes the drain upon the associated power supply and which is therefore ideally suited to use in applications where power is at a premium or where it is desired to reduce the power drain to a minimum. For example, the bistable device is ideally suited for use in encoders, process controls and computers wherein many such devices are employed or for use in satellites and automatic weather stations wherein the available supply of power is severely limited and wherein operation must take place reliably over long periods of time. Another object is to provide a bistable device which requires no standby power.

Still another object of the present invention is to provide a bistable device capable of producing output pulses having a predetermined volt-second content notwithstanding the varying volt-second content or spacing of the input pulses applied thereto. In this connection, an object is to provide a bistable device of this type which responds to input pulses having shorter time periods than the switching cycle of the device. Further in this connection, an object is to provide a bistable multivibrator of this type wherein the predetermined volt-second content of the output pulses is variable. Additionally, an object is to provide a bistable device of this type which responds to input pulses of the same polarity or to input pulses which are alternately of the opposite polarity.

A more specific object of this invention is to provide a bistable device having a pair of conducting sides wherein both sides are normally quiescent and the sides are alternately rendered conductive for predetermined periods of time in response to succeeding input pulses. Another object of the present invention is to provide a bistable device including a saturable transformer and a pair of switch devices associated therewith characterized in that the switch devices are normally in quiescent states and are alternately energized in response to succeeding input pulses for predetermined periods of time so that the core of the saturable transformer is alternately driven to opposite conditions of saturation. In connection therewith, an object is to provide a bistable device of this type wherein means are provided for sustaining a switch device in the energized condition until the core is driven to the opposite condition of saturation even when the input pulse has already been terminated.

Finally, an object of the present invention is to provide a bistable multivibrator or flip-flop which possesses advantages not found in conventional devices of this type but which is inherently simple, susceptible to compact or miniaturized circuit techniques and which may be constructed at low cost as a "building block" for use in more complex apparatus.

Other objects and advantages of the invention will become apparent upon reading the attached detailed description and upon reference to the drawings, in which.

While the invention has been described in connection with certain preferred embodiments, it is to be understood that the invention is not intended to be limited to the disclosed embodiments, but, on the contrary, the invention is intended to cover the various modifications and equivalent arrangements included within the spirit and scope of the appended claims.

Figure 1:
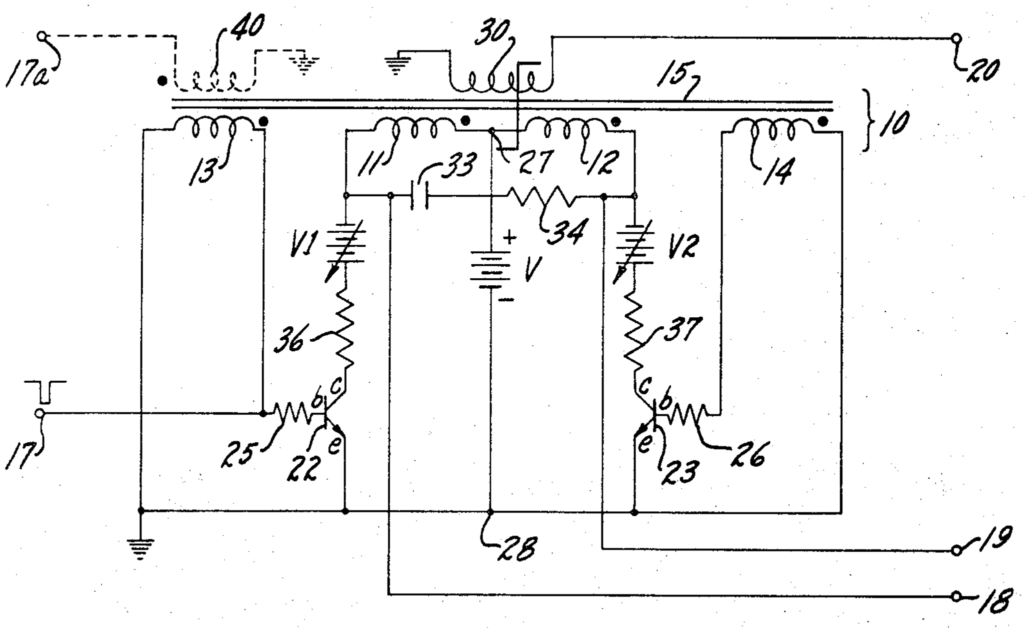
FIGURE 1 is a schematic diagram showing the preferred form of a bistable device constructed in accordance with the teachings of the present invention.

Turning now to the drawings, there is set forth in FIG. 1 a schematic diagram of a bistable device, such as a multivibrator or flip-flop, constructed in accordance with the present invention which has low power drain characteristics. More specifically, a bistable device is provided having two conducting sides which are normally quiescent so that no power is drawn thereby and which are alternately rendered conductive in response to succeeding input pulses so that output pulses having predetermined volt-second contents are provided thereby.

Figure 2:
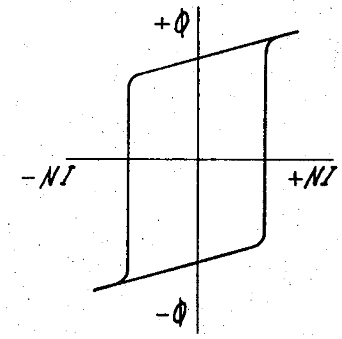
FIG. 2 illustrates the hysteresis loop characteristics of a transformer core material.

The bistable device includes a saturable transformer 10 having a pair of saturating windings 11 and 12 and a pair of input-feedback windings 13 and 14 all wound on a core 15. Additionally, the bistable device has an input terminal 17 and at least one output terminal, three output terminals 18–20 being illustrated. The core is formed of a readily saturable magnetic material preferably having a generally rectangular hysteresis loop as illustrated in FIG. 2, such material being commercially sold by G. L. Electronics Company under the name "Orthonik" type P1040, though the invention is intended to cover the use of any saturable material. The opposite conditions of saturation of the core represent the two stable states of the bistable device.

For the purpose of causing the core to be driven to its opposite conditions of saturation in response to the application of input pulses to the input terminal 17, a pair of transistors 22 and 23 are provided for controlling the flow of current through the saturating windings 11 and 12, the saturating windings being connected in series with the collector-emitter circuits of the transistors. The transistors have base or input circuits which are energized by feedback circuits including the input-feedback windings 13 and 14 and including resistors 25 and 26, the resistors limiting base current flow. Since, in the illustrated embodiment, NPN transistors are used, a positive potential is applied to the center terminal 27 of the transformer windings by a voltage source, designated as V, for feeding the transistor collectors, the emitters thereof being connected to the negative terminal of the voltage source via terminal 28. The transistors are preferably of the type 2N696 manufactured by several manufacturers, including Fairchild, Texas Instruments, and others.

The output terminals 18 and 19 may be respectively connected to the collector circuits of the transistors 22 and 23 so that output pulses may be induced thereat. With these output terminals being utilized, positive and negative-going output pulses will be produced thereat having amplitudes determined by the voltage induced across the saturating windings 11 and 12 and having a reference voltage level corresponding to the supply voltage V. Additionally, an output winding 30 may be wound on the core 15 so that output pulses are induced therein as the core is driven from one state of saturation to the other state of saturation which are transmitted to the output terminal 20. If the output winding 30 is utilized and one terminal thereof is grounded, output pulses will be induced therein having amplitudes determined by the winding characteristics and having a zero reference voltage level. Though three outputs have been illustrated, the invention only requires one output to operate as desired.

For the purpose of improving the form of the output pulses provided at the output terminals, a capacitor 33 is connected across the saturating windings 11 and 12 with a resistor 34 connected in series therewith. The series connection of the capacitor 33 and the resistor 34 also prevents a "free-running" condition of the bistable device. These functions are accomplished by loading down and absorbing voltage spikes induced in response to the collapse, in flux, i.e., fly-back flux, produced upon saturation of the core being attained. Such voltage spikes have a tendency to cause oscillation since they may be of sufficient amplitude to trigger the previously nonconducting transistor whereby reversing of the core saturation would result. However, the capacitor 33 tends to absorb or integrate the voltage spikes and the resistor 34 limits the current flow in response to the voltage spikes so that the effect of the voltage spikes is limited.

In accordance with a feature of the present invention, the transistors 22 and 23 are normally nonconducting, i.e., are in quiescent conditions, and are alternately rendered conductive in response to succeeding input pulses applied to the input terminal 17 due to the voltage developed across the input-feedback windings 13 and 14. More specifically, in response to an input pulse, a voltage is developed across one of the feedback windings having a polarity such that the associated transistor is rendered conductive and the transistor is maintained conductive by a voltage developed across the associated feedback winding until the core has been driven from one state of saturation to the opposite state of saturation. As will become apparent later, the bistable device is so designed that it will operate in response to the application thereto of input pulses of the same polarities or input pulses having alternating polarities. At the present, however, let it be assumed that input pulses all having negative polarities are applied to the input terminal 17.

As may be seen by reference to FIG. 1, the input terminal 17 is connected to the base of transistor 22 through the current limiting resistor 25 and is connected to the dotted terminal of the input-feedback winding 13. The circuit is so polarized, as determined by the dotted winding terminals, that, when the core is in one condition of saturation (assumed to be negative saturation), a negative input pulse induces a voltage in the winding 13 which causes the core to be driven toward the opposite condition of saturation (positive saturation). The induced voltage has a polarity such that the dotted terminal of the input-feedback winding 13 is driven substantially negative with respect to the nondotted terminal. It follows that, due to transformer action, the dotted terminals of all of the windings 11–14 are driven substantially negative with respect to the nondotted terminals. With such a relationship existing in the input-feedback winding 14, the emitter of transistor 23 is driven substantially negative with respect to the base thereof, i.e., the base is driven positive with respect to the emitter, and the transistor is rendered conductive. In response to conduction of the transistor 23, current flows through the saturating winding 12 causing the core to be driven further towards the opposite condition of saturation or positive saturation, the dotted terminal of the saturating winding 12 being maintained negative or being driven more negative with respect to the nondotted terminal as current flows therethrough. Due to the transformer action, the dotted terminal of the input-feedback winding 14 is likewise maintained or driven more negative with respect to the nondotted terminal so that the transistor 23 is maintained conductive even if the input pulse is terminated. Accordingly, the transistor 23 remains conductive until the core is driven to the condition of positive saturation, at which time the voltage induced across the input-feedback winding 14 drops to substantially zero value so that the transistor is rendered nonconductive. At this time, both transistors 22 and 23 are nonconductive or are in quiescent conditions and will remain so until a subsequent input pulse is received.

During the time that transistor 23 is conducting, it will be apparent that the voltage at output terminal 19 is equal to the supply voltage V less the drop across the saturating winding 12. Conversely, the voltage at the output terminal 18 is equal to the supply voltage V plus the drop across the saturating winding 11. An output is also induced at the output terminal 20 during this time and let it be assumed that the winding 30 is so wound that the output corresponds in polarity to the output at terminal 18. It follows that, in response to a spike-like input pulse or an input pulse having a relatively short time period, an output pulse having a relatively long time period may be induced since the voltage induced in the input-feedback winding 14, due to transformer action, causes the transistor 23 to be maintained conductive until the core has attained the opposite condition of saturation.

Conversely, if the core is in the opposite condition of saturation, i.e., positive saturation, when a negative input pulse is applied to the input terminal 17, the input pulse tends to drive the core further toward positive saturation. However, since the core is already saturated in that direction, the impedance of the input-feedback winding 13 is such that the feedback winding appears as a short circuit and a high shorting current will flow therethrough. In response to termination of the input pulse, the high shorting current is interrupted so that a transient voltage spike of reverse polarity is induced in the input-feedback winding 13 which drives the dotted terminal thereof positive with respect to the nondotted terminal and causes the transistor 22 to be rendered conductive. Once the transistor 22 is rendered conductive, current flows through the saturating winding 11 which is in a direction such that the core is driven toward the condition of negative saturation and causes the dotted terminal of the saturating winding to be maintained or driven more positive with respect to the nondotted terminal. It follows that, due to transformer action, the dotted terminal of the input-feedback winding 13 is maintained or driven more positive with respect to the nondotted terminal so that the transistor 22 is maintained conductive until the opposite condition of saturation is attained. At this time, substantially no voltage appears across the input-feedback winding 13 so that the transistor 22 is rendered nonconductive. From the foregoing, it may again be seen that an output pulse having a relatively long time period may be produced in response to a spike-like input pulse or an input pulse having a relatively short time period.

It will be apparent from the foregoing that, in response to succeeding input pulses, the transistors 22 and 23 are alternately rendered conductive so that the core 15 is alternately driven to the opposite conditions of saturation and that, upon a condition of saturation being attained in response to conduction of a transistor, both transistors are maintained nonconductive, i.e., remain in quiescent conditions, until a subsequent input pulse is received.

Figure 3:
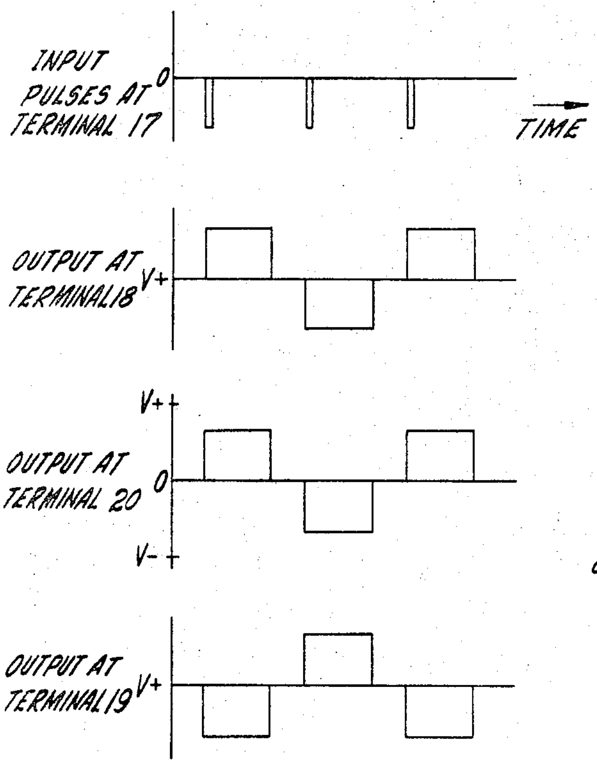
FIG. 3 illustrates the relationships between input pulses and output pulses provided by the bistable device illustrated in FIG. 1.

Referring to FIG. 3, the relationship between typical input pulses applied to terminal 17 and output pulses provided at the terminals 18–20 are illustrated. Referring thereto, it may be seen that output pulses are produced which have time periods substantially greater than the time periods of the input pulses, the time periods corresponding to the time required to drive the core from one state of saturation to the opposite state of saturation. Further, it may be seen that the output pulses induced at output terminals 18 and 19 have a resting or reference voltage level corresponding to the potential V. This is so since when neither of the transistors 22 and 23 is conducting, zero voltage drop is induced across the saturating windings 11 and 12 so that the output terminals 18 and 19 are essentially tied to the positive terminal of the voltage source V. Subsequently, when the transistor 22 is rendered conductive so that the dotted terminals of the saturating windings are driven positive with respect to the nondotted terminals, the potential at output terminal 18 will correspond to the potential V less the voltage drop across the saturating winding 11 and the potential at the output terminal 19 will correspond to the potential V plus the voltage drop across the saturating winding 12. Conversely, when the transistor 23 is rendered conductive so that the nondotted terminals of the saturating windings are driven positive with respect to the dotted terminals, the relationships of the output potentials at the output terminals 18 and 19 reverse.

Since one of the terminals of the output winding 30 is connected to ground, the output provided at output terminal 20 will have a zero resting or reference voltage. It follows that, when the core is driven from a first condition of saturation to a second condition of saturation, a positive output pulse is induced in the output winding 30 and, when the core is driven in the opposite direction, a negative output pulse is induced therein. Since a voltage is induced in a transformer winding as long as the core is being driven from one state of saturation to the other state of saturation, the output pulses induced at output terminal 20 will have time periods corresponding to the time required to drive the core from one state of saturation to the other state of saturation.

Figure 4:
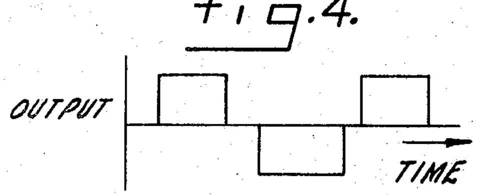
FIG. 4 illustrates output pulses having different time periods which may be produced by the bistable device in FIG. 1.

For the purpose of further preventing "self-sustained" oscillation by the bistable device, resistors 36 and 37 are respectively connected in the collector circuits of transistors 22 and 23. Resistors 36 and 37 function as resistor 34 and, likewise, limit current flow in response to the voltage spikes induced by the collapse in flux produced upon saturation of the core being attained. Additionally, in accordance with a feature of the present invention, means are provided for regulating the time required for the core 15 to be driven from one state of saturation to the other state of saturation and, thus, for regulating the time periods of the output pulses produced by the bistable device. Referring to FIG. 1, variable voltage sources V1 and V2 are respectively connected in the collector circuits of transistors 22 and 23. As is well known in the art, the time required for a core to be driven from one state of saturation to the opposite state of saturation has a direct relationship to the current flowing through the saturating winding which, in turn, has a direct relationship to the amplitude of the voltage supply. Accordingly, the variable voltage sources V1 and V2 allow for varying the supply voltages associated with the saturating windings 11 and 12 so that the time required for driving the core from one condition of saturation to the opposite condition of saturation may be correspondingly varied. Thus, the time periods of the output pulses may also be correspondingly varied, since the time periods thereof correspond to the time required to reverse the condition of saturation of the core 15, and output pulses having desired volt-second contents may be provided in response to succeeding input pulses or spikes. It follows that the output pulses may have the same time periods or the positive and negative-going output pulses may have different time periods, for example, as illustrated in FIG. 4.

In view of the foregoing description of the operation of the bistable device illustrated in FIG. 1, it will be apparent that this bistable device will also operate in response to succeeding input pulses of a positive polarity or succeeding input pulses of alternating polarities. If the input pulses are all of the positive polarity, the transistor 22 will be rendered conductive if the core 15 is in a condition of negative saturation and the dotted terminal of the feedback winding 13 will be driven substantially positive with respect to the nondotted terminal thereof. Accordingly, in response to conduction of the transistor 22, the core will be driven to the condition of negative saturation. Subsequently, when another positive input pulse is received, the feedback winding 13 will appear as a short circuit so that a high shorting current flows therethrough. Upon termination of the input pulse, the shorting current is interrupted causing a transient voltage spike to be induced in the transformer windings due to the transformer action. In this instance, the transient voltage spike will be such that the nondotted terminals of the transformer windings will be driven positive with respect to the dotted terminals. Accordingly, it follows that the transistor 23 will be rendered conductive so that the core is driven back to the then opposite condition of saturation.

If alternating polarity input pulses are applied to the input terminal 17, the transistor 22 will be rendered conductive in response to the positive input pulses since the dotted terminal of the input-feedback winding 13 will be driven positive with respect to the nondotted terminal. Conversely, in response to negative-going input pulses, the dotted terminal of input-feedback winding 13 is driven negative with respect to the nondotted terminal so that, due to transformer action, the nondotted terminal of input-feedback winding 14 is driven positive with respect to the dotted terminal and the transistor 26 is rendered conductive.

Though the device in FIG. 1 has been described with input pulses being applied to the base of transistor 22 and to input-feedback winding 13, the invention is not intended to be so limited. For example, an auxiliary input winding 40 may be wound on the core 15 and input pulses may be applied thereto through an auxiliary input terminal **17*a***. With such an input arrangement, the bistable device will still operate as described hereinabove.

Figure 5:
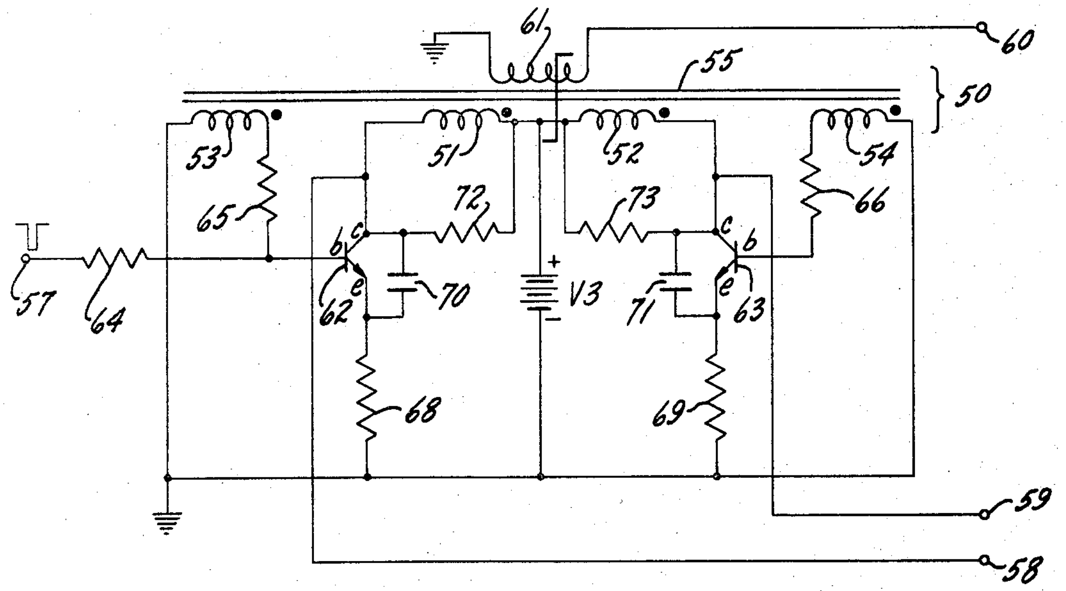
FIG. 5 is a schematic diagram illustrating a second embodiment of a bistable device constructed in accordance with the teachings of the present invention.

In accordance with another aspect of the present invention, a second embodiment of a bistable device is provided having low power drain characteristics. Referring to FIG. 5, there is illustrated a bistable device including a saturable transformer 50 having saturating windings 51 and 52 and input-feedback windings 53 and 54 all wound on a core 55. The saturating windings and the input-feedback windings correspond to windings 11–14 in the bistable device illustrated in FIG. 1. The core 55 is similar to the core 15 and, therefore, is formed of a magnetic material which is easily saturated and which is characterized by a generally rectangular hysteresis loop. Additionally, the bistable device has an input terminal 57 and output terminals 58–60 which correspond to terminals 17–20 in FIG. 1. An auxiliary output winding 61 corresponding to winding 30 in FIG. 1 may also be wound on the core.

For the purpose of driving the core to its opposite conditions of saturation in response to the application of input pulses to the input terminal 57, transistors 62 and 63 are provided which correspond to the previously-described transistors 22 and 23 and which control the flow of current through the saturating windings 51 and 52 from a voltage source, designated as V3. The output terminals 58 and 59 may be respectively connected to the collector circuits of the transistors 62 and 63 and the output terminal 60 may be connected to one terminal of the auxiliary output winding 61 wound on the core 55, the other terminal thereof being connected to ground.

As with the embodiment illustrated in FIG. 1, the bistable device illustrated in FIG. 5 is characterized in that the transistors 62 and 63 are normally in quiescent, nonconducting conditions and are alternately rendered conductive in response to suceeding input pulses applied to the input terminal 57 due to the voltage developed across the input-feedback windings 53 and 54. Since the operation of this bistable device is similar to the operation of the previously-described bistable device, only a brief résumé of the operation will be set forth herein.

In response to a first input pulse, the dotted terminal of input-feedback winding 53 is driven positive with respect to the nondotted terminal and transistor 62 is rendered conductive. In response to conduction of transistor 62, current flows through the saturating winding 51 causing the core 55 to be driven from one condition of saturation to the opposite condition of saturation, for example, from positive saturation to negative saturation. Due to transformer action, the dotted terminal of input-feedback winding 53 is maintained or driven more positive with respect to the nondotted terminal so that transistor 62 is maintained conductive until the opposite condition of saturation is attained. In response to the next suceeding input pulse, the nondotted terminal of input-feedback winding 54 is driven positive with respect to the dotted terminal so that transistor 63 is rendered conductive. In response to conduction thereof, current flows through the saturating winding 52 causing the core to be driven back to the opposite condition of saturation, i.e., from negative saturation to positive saturation. Likewise, due to transformer action, the nondotted terminal of input-feedback winding 54 is maintained or driven more positive with respect to the dotted terminal so that conduction of the transistor 63 is maintained until the opposite condition of saturation is attained.

For the purpose of limiting the input current produced in response to an input pulse applied to input terminal 57, a resistor 64 is provided. Resistor 65 and 66 are also provided for limiting base current in transistors 62 and 63. Additionally, for the purpose of preventing a "free-running" condition, i.e., "free-running" oscillation of the bistable device, resistors 68 and 69 are connected in series with the emitters of transistors 62 and 63, capacitors 70 and 71 are connected across, i.e., in parallel, with the collector-emitter circuits of transistors 62 and 63, and resistors 72 and 73 are connected in parallel with the saturating windings 51 and 52. The resistors 68, 69, 72 and 73 function as the previously-discussed resistor 34 (FIG. 1) and, likewise, limit the current flow in response to voltage spikes induced by the collapse in flux when saturation of the core is achieved. The capacitors 70 and 71, in turn, provide a low impedance path around the transistors 62 and 63 to high frequency transients such as the induced voltage spikes.

Accordingly, it may be seen that bistable devices have been provided which respond to input pulses having shorter time periods than the switching cycles of the devices characterized in that no power is drawn when the bistable devices are not being driven from one stable condition to the opposite stable condition, i.e., characterized in the low power drain characteristics thereof. Thus, it may be seen that bistable devices have been provided which are ideally suited for use in applications wherein the available power supply is severely limited and wherein operation must take place reliably over long periods of time.

We claim as our invention:

1. In a bistable device capable of switching between its states in response to short input pulses of both polarities, the combination comprising, a saturable transformer including a core having at least one saturating winding wound thereon, a source of current, first and second switches each having an input circuit and having an output circuit connected to said saturating winding for controlling flow of current from the source to the windings for driving the core into one condition of saturation or the other depending upon which of the two switches is triggered, said core also having wound thereon a pair of input windings individually connected across the input circuits of said switches to trigger them in response to voltages induced in said input windings and means responsive to input pulses of both polarities for momentarily altering the magnetizing force in the core so that if the core is in one condition of saturation one switch is triggered and so that if the core is in its opposite condition of saturation the other switch is triggered thereby to cause flow of current in the associated winding for driving the core to its opposite condition of saturation in readiness for receipt of a subsequent input pulse.

2. In a bistable device capable of switching between its states in response to short input pulses, the combination comprising, a saturable transformer including a core having first and second input windings as well as first and second saturating windings wound thereon, a source of current, first and second switches each having an input circuit individually connected across respective input windings and an output circuit connected to the respective input and saturating windings for controlling flow of current from the source to the saturating windings for driving the core into one condition of saturation or the other depending upon which of the two switches is triggered, and means responsive to input pulses for momentarily altering the magnetizing force in the core so that if the core is in one condition of saturation a triggering signal is induced in one of the input windings during the existence of the input pulse and so that if the core is in its opposite condition of saturation a triggering signal is induced in the other of the input windings by collapsing flux due to interruption of current through the winding at the end of the input signal thereby to cause triggering of the associated switch and flow of current in the associated saturating winding for driving the core to its opposite condition of saturation in readiness for receipt of a subsequent input pulse.

3. In a bistable device capable of switching between its states in response to short input pulses, the combination comprising, a saturable transformer including a core having first and second input windings as well as first and second saturating windings wound thereon, a source of current, first and second switches each having an input circuit and an output circuit connected to the respective input and saturating windings for controlling flow of current from the source to the saturating windings for driving the core into one condition of saturation or the other depending upon which of the two switches is triggered, means responsive to input pulses for momentarily altering the magnetizing force in the core so that if the core is in one condition of saturation an input signal is induced in one of the input windings while an input pulse is received by said responsive means and so that if the core is in its opposite condition of saturation an input signal is induced in the other of the input windings by collapsing flux linking it when the input pulse received by said responsive means terminates thereby to cause triggering of the associated switch and flow of current in the associated saturating winding for driving the core to its opposite condition of saturation in readiness for receipt of a subsequent input pulse, and means for maintaining the switches in quiescent states during the time periods when the core is not being driven between the conditions of saturation.

4. In a bistable device capable of switching between its states in response to short input pulses of both polarities, the combination comprising, a saturable transformer including a core having first and second input windings as well as first and second saturating windings wound thereon, a source of current, first and second transistors each having an output circuit connected to the respective saturating windings for controlling flow of current from the source to the saturating windings for driving the core into one condition of saturation or the other depending upon which of the two transistors is rendered conductive and each transistor also having an input circuit individually connected across the respective input windings to be triggered in response to voltages induced in said input windings, and means responsive to input pulses of both polarities for momentarily altering the magnetizing force in the core so that if the core is in one condition of saturation an input signal is induced in one of the input windings and so that if the core is in its opposite condition of saturation an input signal is induced in the other of the input windings thereby to cause the associated transistor to be rendered conductive and flow of current in the associated saturating winding to be initiated for driving the core to its opposite condition of saturation in readiness for receipt of a subsequent input pulse.

5. In a bistable device responsive to input pulses having shorter time periods than the switching cycle of the device, the combination which comprises, an input terminal and at least one output terminal, a saturable transformer including a core having a saturating winding and a pair of input windings wound thereon, at least one of said input windings being electrically isolated from said input terminal, a source of voltage, first and second switch devices each having an input circuit and an output circuit, the switch device output circuits being connected to the saturating winding and controlling the flow of current therethrough from the voltage source, and the switch device input circuits being individually connected across the respective input windings for alternately energizing the switch devices in response to succeeding input pulses applied to the input terminal so that the core is alternately driven to the conditions of negative and positive saturation and an output pulse having a prescribed volt-second content is produced at each output terminal in response to each input pulse, and means for maintaining the switch devices in quiescent states during the time periods when the core is not being driven between the conditions of saturation.

6. In a bistable device responsive to input pulses having shorter time periods than the switching cycle of the device, the combination which comprises, an input terminal and an output terminal, a saturable transformer including a core having positive and negative conditions of saturation and also having a plurality of windings wound thereon, a source of voltage, first and second switch devices each having an input circuit and an output circuit, the switch device output circuits being connected to transformer windings and controlling the flow of current therethrough from the voltage source, means responsive to each input pulse for driving said core toward its positive condition of saturation, means responsive to flux induced in said core while it is driven toward its positive condition of saturation for applying a triggering voltage to the input circuit of one of said switch devices, and means responsive to collapsing flux induced in said core at the termination of input pulses applied to said core when it is already near its positive condition of saturation for applying a triggering voltage to the input circuit of the other of said switch devices so that the core is alternately driven to the conditions of negative and positive saturation and an output pulse having a prescribed volt-second content is produced at the output terminal in response to each input pulse.

7. In a bistable device responsive to input pulses having shorter time periods than the switching cycle of the device, the combination which comprises, an input terminal and an output terminal, a saturable transformer including a core having at least one saturating winding and a pair of input windings wound thereon, a source of voltage, first and second switch devices each having an input circuit and an output circuit, the switch device output circuits being connected to the saturating winding and controlling the flow of current therethrough from the voltage source, the switch device input circuits being connected across the respective input windings, means for temporarily driving said core toward a given saturation state in response to successive input pulses so that if said core is already near the saturation condition toward which it is being driven, one of said devices is triggered by voltage induced in its associated input winding by flux collapse at the end of the input pulse and if said core is near the opposite condition of saturation, the other of said devices is triggered by voltage induced in its associated input winding while the core is being driven toward said given condition of saturation by an input pulse so that the core is alternately driven to the conditions of negative and positive saturation and an output pulse having a prescribed volt-second content is produced at the output terminal in response to each input pulse, means for preventing self-sustained oscillation in the bistable device without suppressing the voltage induced by flux collapse, and means for maintaining the switch devices in quiescent states during the time periods when the core is not being driven between the conditions of saturation.

8. In a bistable device responsive to alternating polarity input pulses having shorter time periods than the switching cycle of the device, the combination which comprises, an input terminal and an output terminal, a saturable transformer including a core having a pair of saturating windings and a pair of feedback windings wound thereon, a source of voltage, first and second switch devices each having an input circuit individually connected across the respective feedback windings and an output circuit, each switch device output circuit being connected to one of the saturating windings and controlling the flow of current therethrough from the voltage source, means including the feedback windings associated with the switch device input circuits for causing the switch devices to be alternately energized in response to succeeding input pulses of alternating polarity applied to the input terminal so that the core is alternately driven to the conditions of negative and positive saturation and an output pulse having a prescribed volt-second content is produced at the output terminal in response to each input pulse, and means for maintaining the switch devices in quiescent states during the time periods when the core is not being driven between conditions of saturation.

9. In a bistable device responsive to input pulses having shorter time periods than the switching cycle of the device, the combination which comprises, an input terminal and an output terminal, a saturable transformer including a core having a pair of saturating windings and a pair of feedback windings wound thereon, a source of voltage, first and second transistors each having an input circuit individually connected across a respective feedback winding and an output circuit, each transistor output circuit being connected to a saturating winding and controlling the flow of current from the voltage source therethrough, means including the feedback windings associated with the transistor input circuits for causing the transistors to be alternately and singly rendered conductive in response to succeeding input pulses applied to the input terminal, each transistor input circuit being so coupled to one of the feedback windings that once the transistor is rendered conductive a voltage is induced in the associated feedback winding until the core is driven to the opposite condition of saturation which maintains the transistor conductive, means for coupling the output terminal to the device so that an output pulse having a prescribed volt-second content is induced thereat in response to each input pulse, and means for maintaining the transistors in quiescent, nonconducting states during the time periods when the core is not being driven between the conditions of saturation.

10. In a bistable device responsive to input pulses having shorter time periods than the switching cycle of the device, the combination which comprises, an input terminal and an output terminal, a saturable transformer including a core having a pair of saturating windings and a pair of feedback windings wound thereon, a source of current, first and second switch devices each having an input circuit connected across one of the feedback windings and an output circuit connected to one of the saturating windings to control the flow of current from the current source therethrough, means including the feedback windings associated with the switch device input circuits for causing the switch devices to be alternately energized in response to succeeding input pulses applied to the input terminal so that the core is driven toward the opposite condition of saturation, every other input pulse driving a large current through and producing a subsequent reverse voltage across one of said feedback windings, means responsive to the voltage induced across a feedback winding in response to energization of the associated switch device causing the switch device to remain energized until the core has attained the opposite condition of saturation, means for coupling the output terminal to the device so that an output pulse having a prescribed volt-second content is induced thereat in response to each input pulse, and means for preventing self-sustained oscillation in the bistable device without suppressing the production of said reverse voltage.

11. In a bistable device responsive to input pulses having shorter time periods than the switching cycle of the device, the combination which comprises, a saturable transformer including a core having a pair of saturating windings and a pair of feedback windings wound thereon, a source of current, first and second transistors each having an input circuit and an output circuit, each transistor output circuit being connected to a saturating winding and controlling the flow of current from the source therethrough so that, in response to conduction of the first transistor, the core is driven from negative saturation to positive saturation and, in response to conduction of the second transistor, the core is driven from positive saturation to negative saturation, each transistor input circuit being connected to a feedback winding so that in response to the associated transistor being rendered conductive a voltage is induced in the feedback winding which maintains the transistor conductive until the opposite condition of saturation of the core is attained, means associated with one of the transistor input circuits for applying the input pulses thereto, each of a first series of input pulses driving said core from negative remanence toward positive saturation and concurrently inducing a triggering voltage in the feedback winding connected to said second transistor, and each of a second series of input pulses interspersed with pulses of said first series driving said core from positive remanence further into positive saturation and producing, when they terminate, a flux collapse which induces a reverse voltage in the feedback winding connected to said first transistor of the proper polarity to trigger it, an output terminal, means for associating the output terminal with the device so that an output pulse having a prescribed volt-second content is induced thereat in response to each input signal, and means for maintaining the transistors in quiescent, nonconducting states during the time periods when the core is not being driven between the conditions of saturation.

References Cited

UNITED STATES PATENTS

| | | | |
|---|---|---|---|
| Re. 25,262 | 10/1962 | Bruce et al. | 307—88.5 |
| 3,018,382 | 1/1962 | Carroll et al. | 307—88.5 |
| 3,030,521 | 4/1962 | Lucke | 307—88.5 |

ARTHUR GAUSS, *Primary Examiner.*

J. ZAZWORSKY, *Assistant Examiner.*

U.S. Cl. X.R.

307—246, 289, 314